April 8, 1947. E. UTTERBACK 2,418,679
METHOD AND APPARATUS FOR HYDROCARBON CONVERSION
Filed May 2, 1944 2 Sheets-Sheet 1
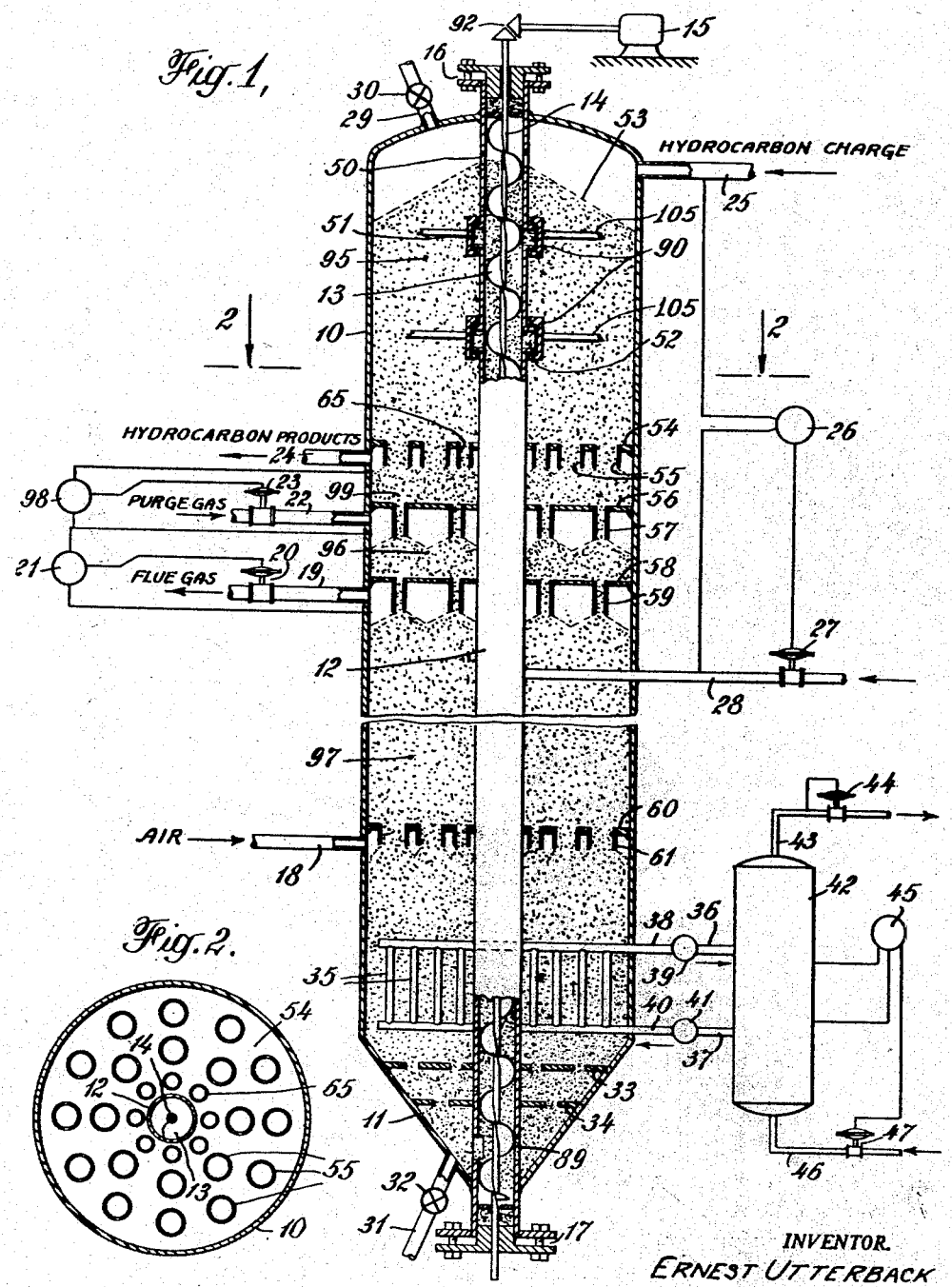
INVENTOR.
ERNEST UTTERBACK
BY
ATTORNEY.

April 8, 1947.     E. UTTERBACK     2,418,679
METHOD AND APPARATUS FOR HYDROCARBON CONVERSION
Filed May 2, 1944     2 Sheets—Sheet 2
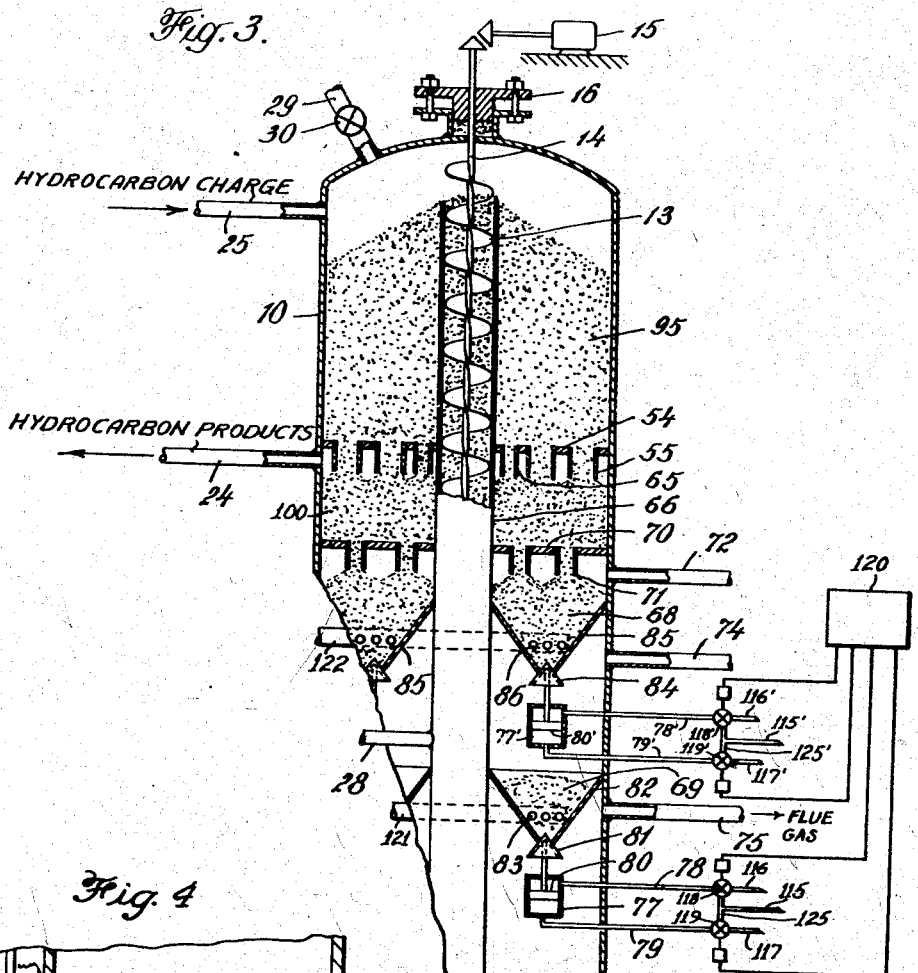
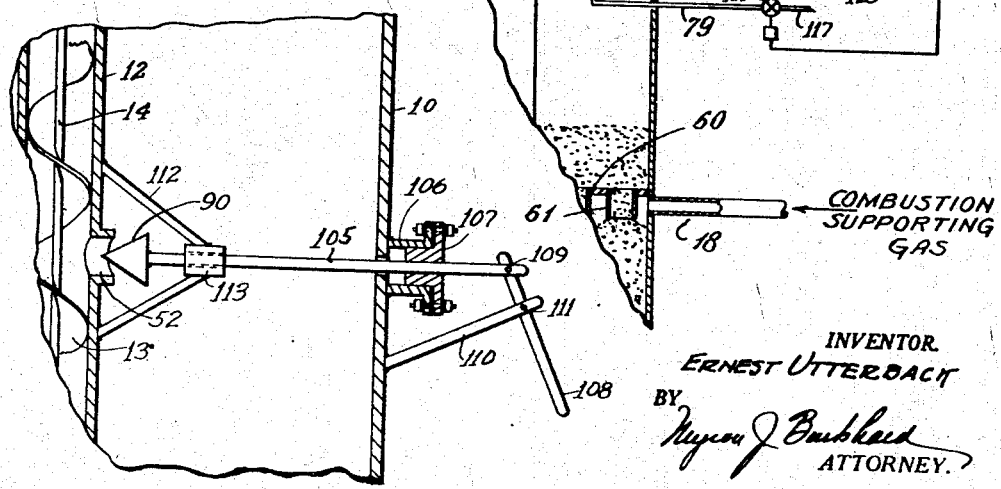
INVENTOR.
ERNEST UTTERBACK
BY
ATTORNEY.

Patented Apr. 8, 1947

2,418,679

UNITED STATES PATENT OFFICE 2,418,679

METHOD AND APPARATUS FOR HYDROCARBON CONVERSION

Ernest Utterback, Upper Darby, Pa., assignor to Socony-Vacuum Oil Company, Incorporated, a corporation of New York Application May 2, 1944, Serial No. 533,674

12 Claims. (Cl. 196—52)

This invention has to do with a method and apparatus for conducting gaseous conversions in the presence of a moving particle form solid contact mass material which may or may not be catalytic in character. Exemplary of such processes is the catalytic hydrogenation, dehydrogenation, desulfurization, reforming, polymerization, alkylation or cracking of hydrocarbons. Typical is the cracking conversion of hydrocarbons, it being well known that gas oils boiling between approximately 500° F. and 750° F. may be substantially cracked to gasoline, gas and heavier products by passing them at reaction conditions of temperature and pressure such as, for example, temperatures of the order of 875° F. at pressures somewhat above atmospheric in contact with a solid adsorptive catalytic contact mass. Usually such contact masses partake of the nature of material or treated clays such as fuller's earth or Super Filtrol or of synthetic associations of alumina, silica or alumina and silica, any of which may have other constituents added such as certain metallic oxides. During the conversion reaction certain coky materials may be deposited upon the catalytic material thereby impairing its catalytic efficiency. This necessitates periodic regeneration of the catalytic material. Recently the process has been developed as one in which the particle form solid contact mass material is moved cyclically through two zones in the first of which it is subjected to gaseous conversion and in the second of which it is subjected to the action of a fluid regeneration medium, such as a combustion supporting gas, acting to burn off contaminant materials deposited upon the contact mass during conversion.

Considerable quantities of heat are liberated by the contaminant combustion in the regeneration zone. Means to remove this heat must be provided in order to prevent over-heating the solid catalytic material beyond certain limiting maximum temperatures beyond which its catalytic activity will be permanently decreased. It has been customary to provide heat transfer tubes either within the regeneration zone or between stages of a multi-stage regenerator. In the former apparatus considerable heat transfer surface may be required to prevent over-heating of the solid contact material, and heat transfer medium at relatively high temperature levels must be used in order to prevent over-cooling of said solid contact material. The multi-stage type regenerators have been found preferable for many applications, since they permit use of heat transfer mediums maintained at low temperature levels thereby providing high temperature differentials across the heat transfer surface and a substantial reduction in the amount of heat transfer surface required. In either of these processes at least two vessels, a conversion vessel and a regeneration vessel are required along with their auxiliary solid material charge or discharge hoppers and sets of two conveyors. It has been found that properly designed units of the multistage type are reasonably economical and feasible when built in large sizes, for example, of 10,000 barrels per day feed stock (measured as liquid) capacity. When, however, the unit size is reduced to, say, 1000 to 4000 barrels per day capacity or less, the reduction in capital cost is not proportional. This difficulty is even more markedly noticeable in catalytic conversion units of other types; and as a result, there is a pressing need for a reasonably inexpensive catalytic hydrocarbon conversion process and apparatus of the small sizes suitable for small petroleum refineries.

The present invention is specifically directed toward such a method and apparatus, wherein a particle form solid contact mass material is cyclically passed as a substantially compact column through a conversion and regeneration zone. In the apparatus of this invention conversion and regeneration zones are superposed within the same vessel and the solid contact material discharging from the lowermost zone is conveyed upwardly through said vessel to the upper end of the uppermost zone by a single large confined conveyor or by a number of smaller ones working in parallel. The conveyor is provided with a driving means located outside said vessel, said driving means permitting ready adjustment of the speed of solid contact material cyclic travel through the conversion and regeneration zone. As will be hereinafter shown, this expedient permits proper control of the solid material temperature throughout its cyclic passage of travel when a single set of heat transfer tubes are provided within the vessel directly below the regeneration zone. As will become apparent from the following description of this invention, the resulting apparatus forms a simple compact unit which in smaller sizes may be factory assembled, if desired, and shipped intact and ready for installation to small refineries. Moreover, the cost of construction of such a unit and the cost of operation thereof is well in proportion to its size.

A major object of this invention is the provision of a simple compact apparatus for conversion of hydrocarbons in the presence of a substantially compact column of moving particle form solid contact material, which apparatus is adapted to the requirements of small refineries.

Another important object of this invention is the provision of a method of operation in processes of the type above described which permits substantial simplification of the apparatus required for removal of regeneration heat from the cycling contact mass material.

Another object of this invention is the provision of an apparatus wherein with the use of a single conveyor, particle form solid material may be continuously cycled through a hydrocarbon conversion and a solid material regeneration zone.

Still another object of this invention is the provision of a method and apparatus for subjecting a moving particle form solid catalyst to hydrocarbon conversion vapors and to catalyst regeneration gases in separate zones within a single vessel while substantially preventing the interflow of vapors or gases between said zones.

Still another object of the invention is the provision in a process of the type hereinabove described of a simple, easily controlled, adjustable means for removing heat from cyclically traveling particle form solid contact material.

These and other objects will become apparent from the following description of this invention.

In order to better understand the invention reference should now be made to the drawings attached hereto of which Figure 1 is an elevational view, partially in section, of a preferred form of the apparatus, Figure 2 is a plan view taken at line 2—2 in Figure 1, and Figure 3 is a partial elevational view, partially in section, of a somewhat modified form of the apparatus. Figure 4 is a view, partially in section, of a portion of the apparatus of Figure 1 directed to certain details therein. All of these drawings are highly diagrammatic in character.

Turning now to Figure 1, we find the closed vessel 10, having a tapered bottom 11. Extending vertically and centrally through said vessel is the conveyor casing 12 which is gas tight except at the openings therein hereinafter described. Near the lower end of said casing and within the tapered drain section 11 of the vessel are the horizontal solid material inlet apertures 89, and along the upper section of said casing at vertically spaced levels are outlet ports 51, 52 and 50 having some suitable means for opening or closing such as covers 90. The purpose of these multi-level outlets for solid material is to permit adjustment in the level of the surface of the solid material column within the vessel. By opening the proper ports, the level of the surface of the solid material will be automatically controlled approximately at the level of the open ports. Some suitable externally controlled lever arrangement, such as shown in Figure 4, attached to the port covers 90 may be provided to permit closing or opening of the ports without entrance into the vessel, and different cover arrangements may also be used. Extending through the casing 12 is a screw conveyor comprised of a central drive shaft 14 with continuous spiral flange 13 attached thereto along that portion of its length within the vessel. The drive shaft extend through the stuffing box arrangements 16 and 17 at the top and bottom of the vessel, respectively. The upper end of the drive shaft is connected through suitable gear arrangement 92 to the variable speed drive motor so that the conveyor may be operated at desired speeds. Other driving means may be substituted for that shown, such as a variable speed drive connection and a constant speed motor. Moreover, if desired, the driving means may be applied to the lower end of the shaft rather than to the upper end thereof.

It will be seen that in operation the conveyor casing is substantially filled with closely packed contact material particles which essentially form therein a substantially compact column of particle form solid material. Such a column provides a seal leg between the conversion and regeneration zones and provides substantial resistance to flow of regeneration or hydrocarbon gases therethrough, any other type of conveyor which will move the solid contact material upwardly through a confined casing may be substituted for the screw conveyor shown herein.

Near the upper end of the vessel 10 is the hydrocarbon inlet conduit 25 positioned above the surface 53 of the solid material in the vessel. Extending across the vessel at an intermediate level is the partition 54, from which depend the short pipes 55 and 65, which serve as passageways for solid material therethrough. These pipes should be uniformly distributed across the partitions 54 and may be of different sizes, as shown, or of equal size. Connected to the vessel 10 at the level of the substantially solid free space provided immediately below the partition 54 is the hydrocarbon outlet conduit 24. Extending across the annular space within said vessel between the casing 12 and the shell 10 are other similar partitions at spaced vertical intervals below the partition 54. These partitions 56, 58 and 60 are provided with similarly uniformly spaced dependent pipes 57, 59 and 61 respectively. Connected to the vessel just below partition 56 is the purge gas inlet conduit 22 and connected just below the partitions 58 and 60 are the flue gas outlet conduit 19 and regeneration gas inlet conduit 18, respectively. The vessel 10 is thus partitioned into a conversion zone 95 extending vertically between partition 54 and conduit 25, an intermediate purge zone 99 extending between partitions 54 and 56, a seal zone 96 between partitions 56 and 58 and a regeneration zone 97 extending between partitions 58 and 60. Within the vessel below the regenation zone are the uniformly spaced vertical heat exchange tubes 35 extending between headers 38 and 40 which in turn connect into manifolds 39 and 41, respectively. These manifolds 39 and 41 connect through pipes 36 and 37, respectively, into the vertical steam drum 42 which is provided with a boiler feed water inlet 46 at its bottom and a steam outlet 43 at its top. A pressure regulating valve 44 is provided on the steam outlet 43, and a liquid level control mechanism 45 operating the inlet valve 47 on inlet pipe 46 is provided to permit control of the water level both in the drum 42 and in the vertical pipes 35. The arrangement thus provides a means to control the rate of cooling of the solid material by simple control of the liquid level in the cooling tubes and permits recovery of the heat removed from the solid material as steam at the desired pressure. It will be apparent that suitable volatile liquids other than water may also be used in this apparatus, if desired. Although the cooling system arrangement described hereinabove is a preferred form due to its simplicity and ease of operating control, other different arrangements for removing heat from the solid contact material at this stage of its cyclic travel may be provided within the scope of this invention. Within the tapered drain section 11 of the vessel are provided the spaced partitions 33 and 34. Properly spaced orifices are provided in these partitions so as to provide for division of the solid material flow into a plurality of streams which are then gradually and proportionately combined into the relatively few control streams flowing into the conveyor casing 12 through apertures 89. This partition and orifice arrangement provides for substantially uniform downward flow of the solid material in the column across the entire annular cross-section of the vessel thereabove. An inlet pipe 29 and valve 30 therein is provided to permit initial filling of the vessel with the particle form solid material and to permit periodic additions of makeup solid from time to time. Likewise pipe 31 with valve 32 is provided at the bottom of the vessel to permit draining the solid material therefrom when desired. It will be understood that the pipes 29 and 31 are not used during the normal cyclic operation of the apparatus except periodically for the purposes above cited.

In operation, the particle form solid material passes downwardly through the conversion zone 95, the purge zone 99, the seal zone 96 and the regeneration zone 97. It then passes into contact with the cooling tubes 35 below the regeneration zone at which location its temperature is adjusted to approximately that desired at the top of the conversion zone. It then passes through the orifices in the partitions 33 and 34 into the casing 12 through apertures 89. It is then conveyed upwardly through the casing 12 as a substantially compact column of solid material and discharged therefrom at the desired level in the reaction zone where it begins another cycle. Hydrocarbon vapors heated to the desired reaction temperature in apparatus, not shown, are charged to the vessel through pipe 25 and pass downwardly through the solid material column therein and through the pipes 55 and 65 in partition 54. The vapors then disengage from the solid material and are withdrawn from the solid free collecting space provided by the partition and pipe arrangement through outlet conduit 24. Regeneration gas, such as air, is charged through conduit 18 into the distributing space below partition 60 and then passes upwardly through pipes 61 and the solid material column within the regeneration zone. Spent regeneration gas or flue gas is withdrawn through conduit 19 from the collecting space below the partition 58. Purge or seal gas, such as steam or flue gas or other inert gas is admitted through conduit 22 to the distributing space below partition 56. Part of this gas then passes upwardly through the downwardly flowing solid material in pipes 57 and section 99, thereby stripping hydrocarbon vapors therefrom and is withdrawn from the vessel along with the hydrocarbon vapor products. The remainder of the seal gas passes downwardly through the bed of solid material in the seal zone 96 and through pipes 59 and is withdrawn with the spent regeneration gases. The rate of seal gas introduction is controlled by diaphragm valve 23 on conduit 22 and by the differential pressure control device 98 so that the pressure in the seal zone 96 is a fixed amount, for example, one-half pound per square inch above that at the bottom of the conversion zone thereabove. A similar diaphragm valve 20 on flue gas outlet conduit 19 and differential pressure control device 21 are provided to control the pressure at the top of the regeneration zone a fixed amount below that in the seal zone. These arrangements effectively prevent the interflow of hydrocarbon or regeneration gases between zones. For a similar purpose, seal gas is admitted through conduit 28 to a location within the conveyor casing intermediate its ends. The diaphragm valve 27 on conduit 28 and pressure control device 26 are provided to permit maintenance of a seal gas pressure at said inlet location above that at the ends of said casing. By this arrangement an inert gas atmosphere is maintained in the conveyor casing 12 thereby preventing the flow thereinto of hydrocarbon or regeneration gases.

It will be understood that the direction of flow of hydrocarbons within the conversion zone and/or the direction of flow of regeneration gas in the regeneration zone may be reversed, if desired, and that suitable arrangements for the distribution of inlet gases and disengagement and collection of outlet gases, other than those shown, are equally applicable to the apparatus of this invention. Such gas distributing and collecting arrangements may be such as will provide other than vertical flow of the gases through the solid material, if desired. Moreover, the positioning of the conversion and regeneration zones within the vessel may be reversed, provided the cooling tubes are also re-located so as to permit contact of the solid material therewith at that part of the solid material cyclic flow passage between its discharge from the regeneration zone and inlet to the conversion zone.

As has been hereinbefore stated, a coky contaminant will be deposited upon the solid material in the conversion zone and the subsequent removal thereof by burning in the regeneration zone results in the liberation of large quantities of heat. It has now been found that in many operations the amount of the contaminant deposit may be controlled by proper control of the rate of cyclic flow of the solid contact material to such an extent as to permit single stage regeneration of the solid material in the absence of cooling surfaces without causing the contact material temperature to rise above a fixed maximum limit above which it would be heat damaged. The heat picked up by the solid material may then be removed in a single cooling stage subsequent to the regeneration of the solid material and prior to its return to the conversion zone. Such operation in general requires higher rate of contact material cyclic travel than have been usual heretofore in cyclic conversion systems wherein the solid material flows through conversion and regeneration zones as substantially compact columns of solid material. As will be shown hereinafter, however, there are some operations in which relatively low rates of contact material cyclic travel may be used within the method of this invention. As an example of the method herein proposed, in a system involving conversion of a certain hydrocarbon to gasoline, it has heretofore been customary to maintain contact material to hydrocarbon charge throughput ratios in the convertor of the order of 1½ to 3 pounds of contact material per pound of hydrocarbon charge. In order to regenerate this contact material, which has a maximum critical temperature of about 1200° F. above which it would suffer heat damage, without overheating, it was necessary to burn off the contaminant deposit in several stages between each of which stages heat was removed from the contact material. By the method of this invention a ratio of the order of 8 to 10 pounds of contact material to 1 pound of hydrocarbon charge was passed through the conversion zone and the contaminant deposited upon the contact material was so limited as to permit burning of the amount of contaminant deposited in a single burning stage followed by a single cooling stage without resultant overheating of the contact material. In operation, the contact material discharging from the conversion zone and entering the regeneration zone was at a temperature of approximately 850° F.; the temperature of the contact material discharging from the regeneration zone was approximately 1150° F. The contact material was then cooled to about 900° F. and passed again to the conversion zone for another cycle. Any fluctuation in the amount of contaminant deposited upon the contact material in the conversion zone (measured, for example, as percent by weight of carbon) can be readily compensated by proper change in the rate of contact material cyclic flow or by such change combined with a change in the amount of heat removed in the cooling stage or in case of minor fluctuations by change in amount of cooling in the single cooling stage alone. In general, for the catalytic conversion of hydrocarbons the cyclic rate of catalyst flow should according to the method of this invention be adjusted so as to limit the temperature of the catalyst from increasing more than about 400° Fahrenheit during its passage through the regeneration zone.

The advantages of such operation are readily apparent. By use of cooling tubes after the regeneration zone instead of within said zone, heat transfer fluids may be employed operating at much lower temperature levels than otherwise would be permissible. This provides very large temperature gradients across the heat transfer tubes and keeps to a minimum the total amount of costly heat transfer surface required. Moreover, systems using boiler feed water may be used permitting the recovery of the heat of regeneration as steam at desirable pressures. Such systems may be much more economical than those employing high melting point heat transfer fluids. The use of a single cooling stage instead of several separated cooling stages, as have been heretofore provided in multi-stage regenerators, not only simplifies and provides less expensive cooling systems, but also greatly simplifies the operation problem.

As has been hereinbefore stated, the method of this invention generally requires somewhat higher rates of contact material cyclic travel than those usual in solid bed continuous conversion system heretofore. The use of a single conveyor within the main vessel housing the conversion and regeneration zones in place of two such external conveyors with transfer lines thereto nd therefrom is particularly well adapted for the generally higher contact material rates of flow. Moreover, the housing of essentially the entire cyclic conversion unit in a single vessel provides for compact economical construction. Units having capacities of the order of 2000 to 4000 barrels a day hydrocarbon charge capacity may be shop fabricated and assembled and shipped to small refineries ready for erection. This simplifies and decreases the cost of the field installation of such units and provides a unit particularly attractive to small refiners. Larger capacity units are well within the scope of this invention but such units would probably require field assembly.

Turning now to Figure 2, we find a plan view taken at line 2—2 in Figure 1 showing the circular cross-section of the vessel 10 and the conveyor casing 12 and showing the partition 54 with pipes 55 and 65 therein. Since the gas flow through the pipes in partitions 54 and 60 is of substantially greater amount than that through the pipes in partitions 56 and 58, the total area of the pipes in the former partitions should be somewhat greater than that in the latter partitions. In any event, the area of the pipes should be sufficient to permit the maximum desired solid material flow therethrough. It should be understood that the invention is not limited to use of vessels of circular cross-section. Turning now to Figure 4 we find a section of vessel 10 of Figure 1 showing details of an externally controlled lever arrangement to permit selective opening and closing of the catalyst discharge ports 51 and 52, and if desired, 50 in the conveyor casing. In Figure 4, one side of the conveyor casing 12 and of the vessel shell 10 is shown. Also shown is a port 52 in casing 12 and a conical-shaped cover 90. A rod 105 is attached on one end to the cover 90 and extends horizontally through flanged nozzle 106 in shell 10. The flanged packing gland 107 is provided to prevent gas loss from the vessel. A lever 108 is pivoted to rod 105 at 109 near its end and also at 111 to fulcrum rod 110 extending upwardly from the vessel shell. The rod 105 is supported within the vessel by bearing gland 113 which is in turn supported from the conveyor casing by rods 112. By hand adjustment of lever 108 the cover 90 may be made to move into or out of contact with port 52. It will be obvious that other modified mechanical arrangements permitting selective discharge of catalyst from the ports at the desired level in casing 12 while preventing discharge from other levels may be substituted for the arrangement shown in Figure 4.

Turning now to Figure 3, we find a partial view of a modified apparatus construction of this invention. This apparatus is similar in most respects to that shown in Figure 1 and like members are numbered the same in both drawings. To avoid repetition only the modified members will be described. The conveyor arrangement is unchanged except that the casing 66 is supported by suitable means (not shown) within the vessel 10 and terminates in an open end near the top of the vessel 10. Solid material discharges into the conversion zone 95 from this open end. Solid material discharge ports on the casing are not shown at other levels within the conversion zone but may be provided, if desired. The principal modifications are in the apparatus structure between the conversion and regeneration zones wherein a system of solid material locks has been substituted for the purge and seal zones. Spaced vertically below the partition 54 and extending across the annular space between the vessel shell 10 and the casing 66 is the partition 70 with uniformly distributed dependent pipes 71. Connected to the vessel immediately below the partition 70 is the gas outlet conduit 72, the purpose of which will be hereinafter described. Vertically spaced below the partition 70 are the downwardly sloping converging partitions 85 and spaced therebelow similar partitions 82. These partitions serve to define solid material accumulation chambers or locks 68 and 69. Solid material drain openings are provided at intervals at the location of convergence of each set of partitions and conical shaped wedges 84 and 81 are provided to close or partly close these openings. The wedge 81 is shown connected through a suitable shaft to a piston 80 which is placed within the cylinder 77. By controlling the gas pressure within either end of the cylinder through pipes 78 and 79 connected to either end thereof, the wedge 81 may be caused to move upwardly or downwardly, thereby closing or opening the openings for solid material drain from lock 69. The wedge 84 is similarly driven. By means of a suitable externally located timing device the positioning of the closing wedges 81 and 84 controlling solid material flow from locks 68 and 69 may be so controlled that the solid material may drain from lock 69 to the regeneration zone therebelow, while lock 68 is closed off therefrom, and so that lock 69 is closed off from the regeneration zone while being filled with solid material from lock 68. The automatic cyclic operation of pistons 80 and 80' may be accomplished by any of a number of timing device arrangements well known to the art. For example, an electrical timing device 120 may automatically operate the three-way valves 118, 119, so as to admit steam pressure from pipes 115 into either pipe 78 or 79 while permitting the escape of steam from the remaining pipe 78 or 79 through exhaust pipes 116 or 117 respectively. The same timing device similarly operates cylinder 77' on a predetermined cycle. Perforated pipes 86 and 83, connected through the back-side of the shell 10 to a source of inert gas supply introduced through conduits 122 and 121 respectively may be provided within the locks 68 and 69, respectively, to permit purging of the solid material. This purge gas may be permitted to pass up through pipes 71 and zone 100 for further purging of the solid material, if desired. Outlet conduits 72 and 74 are provided for withdrawing these gases when desired and also to permit pressuring or evacuating the locks, when desired. Flue gas outlet conduit 75 is provided below partitions 82 and so located as to permit withdrawal of regeneration flue gas from a substantially solid free gas collecting space below said partitions. Such an arrangement of locks located between conversion and regeneration zones prevents the interflow of hydrocarbon or regeneration gases between the conversion and regeneration zones and also permits purging of hydrocarbon vapors from the solid material before its flow to the regeneration zone. Such an arrangement is particularly desirable in operations wherein the conversion and regeneration zones are to be maintained under substantially different gaseous pressures.

The proper design of the apparatus of this invention and the proper choice of operation conditions is dependent upon a great number of variables which are inherent in any particular application of the invention. Such variables are the nature of the hydrocarbon stock to be converted, the type or severity of the conversion contemplated, the type of solid contact material used, the rate of the conversion and regeneration reactions per volume of regeneration and reaction zones, the amount of contaminant deposited by the conversion reaction, the heat transfer coefficients for the particular contact material and heat transfer fluid used and the operating pressures in the conversion and regeneration zones. Many of these variables may be already known from operations involving the use of the contact material and hydrocarbon charge particularly contemplated in current types of catalytic conversion apparatus. The other variables are of such nature as may be easily determined for specific applications by controlled experiments on existing equipment. Such experiments may be easily made by those skilled in the art before commencing the design of the apparatus of this invention.

It should be understood that the invention is not limited to operations involving hydrocarbon conversion but may be applied to other operations involving endothermic and exothermic reactions. It should be further understood that the foregoing illustrations of the construction, operation and application of this invention are merely exemplary in character and are in no way intended to limit the scope of this invention except as it is limited in the following claims.

I claim:

1. An apparatus for contacting reactant vapors with a particle form solid contact mass material and for regeneration of said solid material comprising: a closed, elongated, vertical vessel suitable for confining a substantially compact column of said solid material throughout the major length thereof, means to convey said solid material as a confined substantially compact column upwardly through said vessel from the lower end thereof to a level within the upper section of said vessel to supply solid material onto the surface of said solid material column within said vessel, means for maintaining an inert seal gas atmosphere within said conveying means substantially throughout its length, means for passing conversion vapors through a vertical section of said column of solid material within one section of said vessel, means for passing a regeneration gas through a second vertical section of said column of solid material within a second section of said vessel, means to pass inert gas through a third section of said column intermediate said above named sections, and means for cooling said solid material positioned within said vessel below said second named section.

2. An apparatus for conversion of hydrocarbon vapors in presence of a particle form solid catalyst and for regenerating said catalyst comprising: a closed, elongated, vertical vessel suitable for confining a substantially compact column of said catalyst throughout a major portion of the length thereof, at least one gas tight casing within said vessel, said casing provided with inlet apertures for catalyst adjacent its lower end and discharge openings for catalyst at at least one level within the upper section of said vessel, externally driven mechanical conveying means within said casing for moving said catalyst from the lower end of said vessel to a level above the surface of said catalyst column within said vessel, means to maintain a substantially inert gas atmosphere within said conveyor casing, hydrocarbon inlet means to the upper section of said vessel at a level above the level of the uppermost catalyst discharge openings in said casing, means for deflecting said catalyst flow so as to provide substantially catalyst-free gas collecting spaces at an intermediate level within said vessel substantially below the level of the lowermost catalyst discharge openings in said casing, conversion product outlet means from said vessel positioned in communication with said gas collecting spaces, means for deflecting said catalyst flow spaced within said vessel vertically below said first named deflecting means, said second named deflecting means providing substantially catalyst-free gas distributing spaces, inert gas inlet means to said vessel positioned in communication with said distributing spaces, a third and fourth set of catalyst flow deflecting means spaced within said vessel at vertical intervals below said second named deflecting means, said deflecting means providing spent regeneration gas collecting spaces at one level within said vessel and vertically spaced therefrom regeneration gas distributing spaces at a second level, regeneration gas inlet means to said vessel positioned in communication with said regeneration gas distributing spaces and regeneration gas outlet means from said vessel positioned in communication with said regeneration gas collecting spaces, a plurality of vertical cooling tubes positioned within said vessel below the lowermost of said deflecting baffles, and means to control a cooling fluid level within said tubes.

3. An apparatus for contacting reactant vapors with a particle form solid contact mass material and for regeneration of said solid material comprising: a closed, elongated, vertical vessel suitable for confining a substantially compact column of said solid material throughout the major length thereof, means to convey said solid material as a confined substantially compact column upwardly through said vessel from the lower end thereof to a level within the upper section of said vessel and means to discharge said solid material onto said column of solid material within said vessel, inlet means for admitting an inert seal gas within said conveying means at a point intermediate its ends and means for controlling the gaseous pressure at said point of inlet above that at either end of said conveying means, means for passing conversion vapors through a vertical section of said column of solid material within said vessel, means for passing a regeneration gas through a second vertical section of said column of solid material within said vessel, means to pass inert purge and seal gas through a third section of said column intermediate said above-named sections, means to control the gaseous pressure at its inlet to said third named section constantly above the pressure in either of said first named and second named sections, means positioned within said vessel directly below said second named section for removing heat from said solid material.

4. An apparatus for conversion of hydrocarbons in the presence of a particle form solid contact mass material and for the regeneration of said solid material comprising: a closed, elongated vertical vessel suitable for confining therein a substantially compact column of said solid material, at least one upwardly extending, conveyor casing within said vessel having inlet apertures for said solid material near its lower end and having discharge ports therein at at least two spaced levels within the upper section of said vessel, adjustable means to control solid material flow from said ports, said means being such as to permit selective closing and opening of the ports at desired levels, an externally driven mechanical conveyor within said casing for moving said solid material as a substantially compact confined column from the lower end of said vessel to the selected level within the upper section thereof, means to continuously admit an inert seal gas to said conveyor casing at a location intermediate the ends thereof, means to maintain a positive pressure differential between said seal gas inlet location and the ends of said casing, gas inlet and gas outlet means spaced vertically apart within the upper section of said vessel thereby providing a zone for hydrocarbon gas flow through said column of solid material within said vessel between said inlet and outlet, gas inlet and gas outlet means spaced vertically apart within the lower section of said vessel thereby providing a zone for regeneration gas flow through said column of solid material within said vessel between said last named inlet and outlet, inert gas inlet means to a third section of said vessel intermediate said first named sections, means to control the inert gas pressure in said third section substantially above the gas pressure in either of said first named sections, heat exchange tubes within the lower end of said vessel below said regeneration zone, means to supply heat exchange medium to said tubes.

5. An apparatus of the type described comprising: a closed vertical cylindrical vessel, a cylindrical conveyor casing within said vessel along the vertical axis thereof, said casing provided with apertures opening laterally near its lower end for admittance of particle form solid material, adjustable discharge ports at at least two levels along the upper portion of said casing, said ports being such as may be selectively closed and opened, as desired, an externally driven spiral conveyor within said casing for transferring particle form solid material from the lower end of said vessel to the levels of said discharge ports to supply solid material from the selected ports to that annular space provided within said vessel between the vessel shell and the conveyor casing, conduit means to admit an inert seal gas to said conveyor casing intermediate the ends thereof, a regulator valve on said inlet conduit to maintain the gaseous pressure at said inert gas inlet above that at either end of said casing, a series of vertically spaced sets of solid flow deflecting baffles within the annular space between said vessel shell and said conveyor casing, said deflecting baffles being so arranged as to form substantially solid free gas collecting and distributing zones vertically spaced apart within the upper and lower sections of said vessel and a distributing zone within the intermediate section of said vessel, conversion gas inlet and outlet conduits connected to said vessel opposite respective gas distributing and collecting zones in the upper part of said vessel thereby providing for conversion gas flow through the solid material within the upper section of said vessel, regeneration gas inlet and outlet conduits opposite respective gas distributing and collecting zones within the lower part of said vessel, inert gas inlet conduit opposite the remaining gas distributing zone located intermediate the sections for regeneration and conversion gas flow, a regulating valve on said inert gas inlet conduit to control pressure within said inert gas distributing zone above that at said conversion gas outlet, a regulating valve on said regeneration gas outlet to control pressure at said outlet a fixed amount below that at said seal gas inlet, vertical cooling tubes within said vessel below said section for regeneration gas flow, means for controlling a volatile fluid level within said tubes.

6. An apparatus for conversion of hydrocarbons in presence of a moving particle form solid material comprising: a closed vertical cylindrical vessel, a cylindrical elevator casing along the vertical axis of said vessel providing an annular space for maintenance of a column of particle form solid, said casing provided with laterally opening inlet apertures for said particle form solid near the lower end thereof and outlet openings for discharge of said solid near the upper end thereof, a spiral conveyor within said casing, the drive shaft of which extends through one end of said vessel, adjustable speed external drive means for said conveyor, means to continuously admit seal gas to an intermediate point along said conveyor casing, means within the lower end of said vessel to control uniform solid material flow rate across the entire column cross-section thereabove, a plurality of spaced vertical cooling tubes positioned within the lower end of said vessel above said flow control means, means to control the level of a volatile heat transfer liquid within said tubes, a partition extending horizontally across said annular space within said vessel shortly above said cooling tubes, short uniformly distributed pipes depending from said partitions, regeneration gas inlet conduit connected to said vessel at a level below said partition and above the lower ends of said pipes, a second, third and fourth partition at spaced vertical intervals above said first named partition, similar short uniformly distributed pipes depending from each of said partitions, a regeneration gas outlet conduit connected to said vessel just below said second partition, an inert gas inlet conduit connected to said vessel just below said third partition, a conversion gas outlet conduit connected to said vessel just below said fourth and uppermost partition, a conversion gas inlet conduit near the upper end of said vessel, means to maintain the pressure at said inert gas inlet above that at said conversion gas outlet and above that at said regeneration gas outlet.

7. An apparatus according to claim 1 characterized by the fact that said means to convey solid material is provided with an externally located means to adjust the speed of operation thereof.

8. An apparatus of the type described for conversion of hydrocarbons comprising: a closed vertical vessel suitable for confining a column of particle form solid contact mass material therein, an upwardly extending conveyor casing within said vessel, said casing provided with inlet aperatures for said solid material near the lower end thereof and at least one discharge opening for said solid material near the upper end thereof, a spiral conveyor within said casing, adjustable speed drive means connected to the drive shaft of said conveyor without said vessel, means to maintain a substantially inert gas atmosphere within said conveyor casing substantially throughout the length thereof, vertically spaced hydrocarbon vapor inlet means and outlet means to said vessel within the upper section thereof to provide for hydrocarbon vapor flow through a reaction zone within the upper section of said vessel between said inlet means and outlet means, vertically spaced regeneration gas inlet means and outlet means to said vessel within the lower section of said vessel to provide for regeneration gas flow through a regeneration zone within the lower section of said vessel between said inlet means and outlet means, downwardly tapered partitions extending across the vessel between the shell thereof and said conveyor casing at two vertically spaced levels within the intermediate section of said vessel, said partitions thereby defining sets of superposed chambers, solid material outlets from the lower section of each of said chambers within said vessel and automatically operated valves thereon, a suitable timing system to actuate said valve operation so as to permit filling of the uppermost chambers with said solid material during the emptying of the lowermost chambers and to permit the isolation of said lowermost chambers from said regeneration zone during filling of said lowermost chambers, means to admit inert gas pressure to either of said chambers and means to reduce pressure in either of said chambers, a plurality of uniformly distributed vertical heat transfer tubes positioned below said regeneration zone within said vessel, means to control a cooling fluid level within said tubes.

9. A method for conversion of hydrocarbons in the presence of a moving particle form solid catalyst comprising: passing said catalyst cyclically through separate conversion and regeneration zones as a substantially compact column of downwardly flowing particle form solid catalyst, introducing hydrocarbon vapors heated to desired conversion temperature into said conversion zone and passing it through said moving catalyst therein while substantially preventing its flow to said regeneration zone, passing combustion supporting gas through said regeneration zone at a rate sufficient to support combustion of substantially all the contaminant deposited upon said catalyst in said conversion zone while substantially preventing the flow of said combustion supporting gas into said conversion zone, removing at least the major portion of the heat liberated by said contaminant combustion from said moving catalyst after its passage through said regeneration zone and prior to its return to said reaction zone, and controlling the rate of said cyclic catalyst flow so as to prevent the temperature of said catalyst in passing through said regeneration zone from rising above a predetermined fixed maximum above which said catalyst would be heat damaged.

10. A method for conversion of hydrocarbon vapors in the presence of a moving particle form solid contact mass material comprising: maintaining a substantially compact column of particle form solid contact material within an elongated vertical vessel, conducting said solid material from the lower end of said vessel as a substantially compact, continuous, confined stream upwardly through said column within said vessel to the surface of said column, maintaining an inert gaseous pressure at an intermediate point in said stream above that at either end thereof, passing properly preheated hydrocarbon vapors through a section of said column within the upper end of said vessel, passing combustion supporting gas through a section of said column within the lower end of said vessel at a rate sufficient to substantially remove all the contaminant deposited upon said solid material in said section for hydrocarbon flow, maintaining an inert gas pressure within a section of said column intermediate said above-named sections, which pressure is higher than that in either of said sections, passing a cooling medium in indirect heat transfer relationship with said column of moving solid material below said section for combustion gas flow so as to remove substantially all the heat released by combustion of said contaminant deposit, and controlling the total rate of solid material circulation so that the solid material temperature is prevented from rising in said combustion gas flow section above a predetermined fixed maximum above which said solid material would be heat damaged.

11. A process of the type described for conversion of hydrocarbon vapors in the presence of a particle form solid contact mass material comprising: maintaining a substantially compact column of downwardly moving particle form solid contact mass material through superposed conversion and regeneration zones, passing hydrocarbon vapors under controlled temperature and pressure through said column within said conversion zone, passing combustion supporting gas through said column within said regeneration zone at a rate sufficient to support combustion of substantially all the contaminant deposited upon said solid within said conversion zone, admitting inert gas to said column intermediate said reaction and regeneration zones and passing it through a vertical length of column between said zones, passing a cooling medium in indirect heat transfer with said column at a location below said regeneration zone, the rate of cooling medium flow being adjusted to cool said solid material to the desired reaction zone inlet temperature, conducting said solid material from the lower end of said column upwardly therethrough to the surface thereof, said solid material being conducted as a substantially compact, confined continuous stream in such a way as to substantially prevent entrance of hydrocarbon vapors or regeneration gas into the ends of said compact stream, and the rate of said solid material circulation being adjusted so as to limit the temperature of said solid material from increasing by more than 400° Fahrenheit during its passage through said regeneration zone.

12. A method for conversion of hydrocarbon vapors in the presence of a moving particle form solid contact mass material comprising: maintaining a substantially compact column of particle form solid contact material within an elongated vertical vessel, conducting said solid material from the lower end of said vessel as a substantially compact, continuous, confined stream upwardly through said column within said vessel to the surface of said column, maintaining an inert gaseous pressure at an intermediate point in said stream above that at either end thereof, passing properly preheated hydrocarbon vapors through a section of said column within the upper end of said vessel, passing combustion supporting gas through a section of said column within the lower end of said vessel at a rate sufficient to substantially remove all the contaminant deposited upon said solid material in said section for hydrocarbon flow, maintaining an inert gas pressure within a section of said column intermediate said above-named sections, and cooling said solid material at a location below said section for combustion gas flow.

ERNEST UTTERBACK.

REFERENCES CITED

The following references are of record in the file of this patent:

UNITED STATES PATENTS

| Number | Name | Date |
|---|---|---|
| 1,836,301 | Bechthold | Dec. 15, 1931 |
| 2,304,397 | Campbell | Dec. 8, 1942 |
| 2,311,984 | Guild | Feb. 23, 1943 |
| 2,351,214 | Kaufmann et al. | June 13, 1944 |
| 2,253,486 | Belchetz | Aug. 19, 1941 |
| 2,376,365 | Lassiat | May 22, 1945 |
| 2,380,760 | Huff | July 31, 1945 |

OTHER REFERENCES

Woog, A. P. C. Pub. of Ser. No. 434,440, pub. June 1, 1943, 23–288.3.